United States Patent [19]
Breyer et al.

[11] Patent Number: 5,959,612
[45] Date of Patent: Sep. 28, 1999

[54] COMPUTER POINTING DEVICE

[76] Inventors: Branko Breyer, Prilzas G. Degelica 79; Bozidar Ferek-Petric, Sovinec 17, both of Zagreb, Croatia

[21] Appl. No.: 08/693,139

[22] PCT Filed: Feb. 15, 1995

[86] PCT No.: PCT/EP95/00549

§ 371 Date: Aug. 13, 1996

§ 102(e) Date: Aug. 13, 1996

[87] PCT Pub. No.: WO95/22097

PCT Pub. Date: Aug. 17, 1995

[30] Foreign Application Priority Data

Feb. 15, 1994 [HR] Croatia ................................. P 9401 04
Feb. 15, 1994 [HR] Croatia ................................. P 9401 05

[51] Int. Cl.⁶ ................................................ G09G 5/08
[52] U.S. Cl. ............................ 345/157; 345/145; 345/168
[58] Field of Search ..................... 345/168, 145, 345/157, 158; 178/18, 19, 20; 341/22

[56] References Cited

U.S. PATENT DOCUMENTS 5,059,959 10/1991 Barry ...................................... 345/168
5,168,531 12/1992 Sigel ....................................... 345/157

FOREIGN PATENT DOCUMENTS

0 214 453  3/1987  European Pat. Off. .

*Primary Examiner*—Brent A. Swarthout
*Attorney, Agent, or Firm*—Lahive & Cockfield, LLP

[57] ABSTRACT

A compact computer pointing device without moving parts detects the movement of objects, typically an operator's hand, in a detection area at a pre-selected height above the device. In an ultrasonic embodiment, the device includes two ultrasonic transmitter-receivers mounted at an appropriate position on the computer housing or keyboard. These transmitter-receivers use the Doppler effect to sense the vector velocity of objects moving in front of them. In an optical embodiment, the device consists of two optical emitters-receivers mounted at an appropriate position on the computer housing or keyboard. These emitter-receivers sense the vector velocity of objects moving in front of by cross-correlating the light reflected from the object with the incident light. In both the ultrasonic and the optical embodiment, the velocity vector thus determined is used to generate signals for corresponding movement of a pointer on the computer display. The device is particularly suited for compact computers in which space is limited.

25 Claims, 5 Drawing Sheets

COMPUTER POINTING DEVICE

BACKGROUND OF THE INVENTION

1. Field of the Invention

This invention relates to computer pointing devices, in particular to such devices as used in portable computers.

2. Background and Prior Art

The presently used pointing devices like the mouse, the joystick or trackball use mechanical moving parts to translate the operator's hand movements into the movements of the computer cursor. However, in small and portable computers, like laptop computers, the space on the keyboard is inadequate for mounting of such devices which are of dimensions suitable for easy and unrestrained actuation. During operation, the operator's hand often covers the keyboard or an essential part of it and the pointing device is too small compared to the hand to precisely control the movement. In computers and control panels designed for operation under adverse conditions (water, dust, body liquids, etc.) it may be bard to make the system tight and protected. Other solutions include pointing devices to be used at the screen, like the light pen. Such a device has the disadvantage of being a separate additional device, sometimes hard to use on a tilted screen. Yet other pointing devices, such as digitizers, have been invented and are in use in precision digitalization. These include acoustic tablets, where two orthogonal microphones detect the relative position of a sound source (e.g. an electrical discharge at the tip of a pen-like device) based on the time elapsed for the sound to reach the respective microphones. In all cases known to us, the pointing device is movable or separate device, often requiring the possibility and space to lean the hand and arm against a fixed object in order to closely control the movements of the hand controlling the pointing device.

SUMMARY OF THE INVENTION

It is an object of the present invention to provide for a computer pointing device which enables the control of the cursor movements by activation of a device containing no moving parts and thus overcome the problems of the present small or separate pointing device actuators mentioned above. The pointing or control device shall be compact and protected from impairment by water, dust, body liquids etc. within a housing.

The invention is characterized by the features of claim 1. Advantageous embodiments of the invention are described in the remaining claims.

Figure 1:
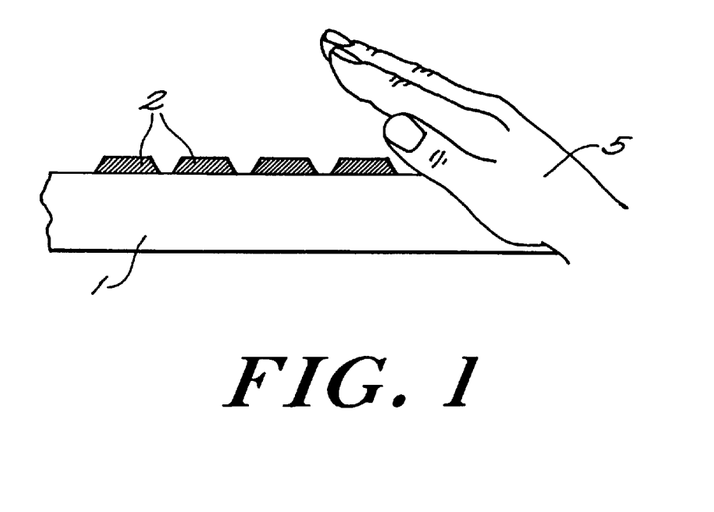
FIG. 1 is a perspective view of the operator's hand leaning against the pointing device and moving in order to move the cursor on the computer screen.

The apparatus according to the invention enables the control of the cursor movements by activation of devices without moving parts and thus overcomes the problems of the present small pointing device actuators in the following way:

The movement of the object may be detected and conveyed to the computer memory by an optical movement detection device at the bottom of a recess on the computer housing or by a set of ultrasonic transceivers at the same place. These devices may be mounted onto a protrusion from the computer housing as well. In both cases the detectors use waves (mechanical or electromagnetic) to detect the movement of, for example, the operator's hand in front of the device as illustrated in FIG. 1.

The optical system contains light transmitters and receivers that can detect movements of objects moving in front of them. This detection is designed in such a way as to particularly detect the movement of the operator's palm leaned against the recess. The transmitter's and the receiver's directivity characteristics are focused and intersect at the level of the palm surface as the palm is moved in front of the recess. The transmitter-receiver sets are arranged orthogonally so that each of the sets can detect one (Cartesian) coordinate of the movement. Other angular arrangements have a lower sensitivity. The movement detection is done by the calculation of the cross correlation of the detected light levels at pairs of light receivers which are a known distance apart and detection of the time delay corresponding to the speed of the object passing in front of the detectors. The crosscorelation function has an extreme at the delay which corresponds to the time needed for the two light reflection variation functions to match. They are detected by the light receivers. The velocity of the movement is the ratio of the distance between the detectors and the characteristic delay at which an extreme occurs in the cross correlation function. Thus calculated velocity can be used to steer the cursor on the computer screen.

The two sets of optical movement detectors may be positioned in a recess in the computer housing in order to define the sensitivity distance and to protect the detectors. The confirmation of an action, once the appropriate icon has been pointed at, is done by additional buttons on the keyboard.

As a further example, there exists the possibility of detecting the movements of the operator's palm in front of a predetermined area on the computer by the use of ultrasonic waves. The detectors in this case are ultrasonic transducers capable of transmitting ultrasonic waves into the air and receiving ultrasonic waves reflected from a reflective object in front of them (e.g. operator's palm as in FIG. 1). Two sets of the transducers detect waves at a space angle. This is achieved by tilting the axes of their directivity functions, preferably in such a way that the projections of the axes onto the surface where they are mounted are at 90°, i.e. their azimuthal angles are at 90°. Other angles may be used as well, but they yield a lower movement detection sensitivity. Their elevation angles are normally less than 60°. The piezoelectric transducers are used for Doppler measurement of movements of the objects in front of them.

If continuous wave Doppler technique is used the transducers are pairs of transmission-reception transducers. In this case, the orientation of the split between the two transducers determines the axis in which the movement is measured in addition to the orientation obtained by the axis tilting. The directivity characteristics of the transducers within a pair must be chosen such as to overlap only within a short distance in order to yield an axial resolution. The said distance must be at a depth at which the operator's palm lays while operating the pointing device.

If a pulsed wave Doppler system is used, each of the transducers acts both as transmitter and receiver with ultrasound pulse length and time delay determining the space resolution and measurement position respectively. The distance determined by the said range-gate must be at-the distance of the operator's palm when moving the cursor. The length of the ultrasound pulse determines the height to which the palm must be lifted in order not to activate the pointing device. In both cases, the movement of the hand above the sensitive area on the computer keyboard yields two Doppler signals which describe the movement of the hand in two dimensions and which can be transformed into the steering signal for the movement of the cursor on the computer GUI (graphic user interface) screen. In both cases, the movement function is not activated if the palm is not moved within the detecting area, i.e. a predetermined height above the pointing device. This height is determined by the range-gate delay, the length of the ultrasound pulse for pulsed Doppler device, and by the overlapping area for continuous wave method.

The electronic circuits use the measured Doppler velocity component data by vector summing them and converting these data into signals used for the change of the cursor address, i.e. position of the cursor on the screen. The function of the mouse or trackball buttons, i.e. the confirmation of an action once the appropriate icon has been pointed at, is done by additional buttons on the keyboard.

The result of the outlined procedure yields an original method for driving the cursor in a Graphic User Interface (GUI).

DESCRIPTION OF THE PREFERRED EMBODIMENTS

In the embodiment of FIG. 1, the utilization of a computer pointing device without moving parts is demonstrated. The pointing device described herein is based on the detection of the amount and direction of the movement of the operator's palm 5 in front of the here described pointing device, being mounted on the edge of the computer housing 1 at the keyboard 2.

Figure 2:
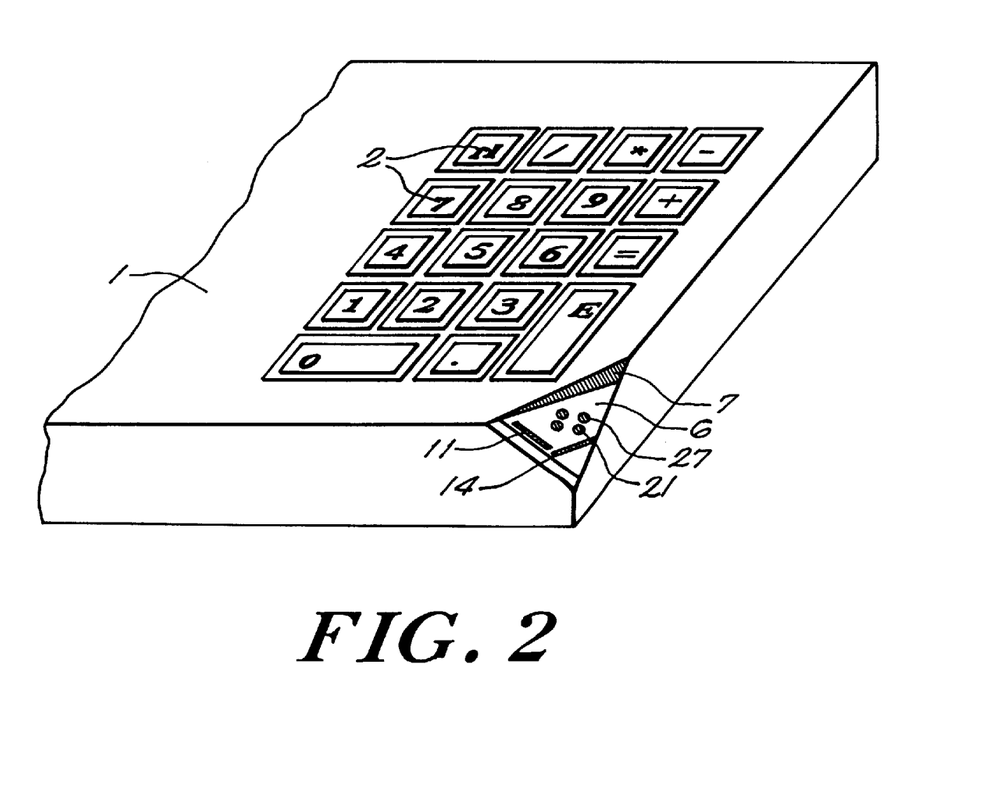
FIG. 2 is a perspective view of the right lower corner of a typical computer keyboard with a recess where the pointing device that detects hand movements in positioned.

Referring to FIG. 2, one sees that our pointing device has no moving parts at all. It is positioned at the right side of the computer keyboard for right handed operators and it can be mounted at left side for the left handed operators. The position of the pointing device is such that it can be accessed without obstructing the view of or access to the keyboard.

The pointing device consists of a recess 7 in which the housing 1, in this case is a triangular recess, but which may have any suitable form (e.g. round, square, etc.). At the bottom 6 of the recess 7 there are mounted linear light transmitters 11 and 14 at right angles to each other, and light receivers 21,27, . . . in pairs which are parallel to the light transmitters 11, 14.

Figure 3:
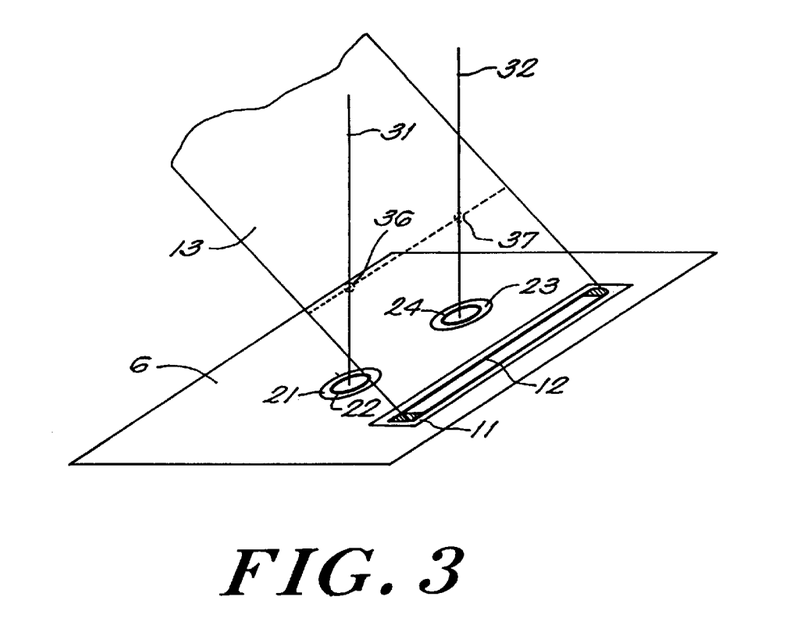
FIG. 3 is a schematic perspective drawing of an optical setup for movement detection.

The top of the recess 7 is covered with a light-transparent cover (not shown, e.g. glass sheet) in order to protect the movement detectors and to keep the distance between the palm surface and the bottom 6 constant. The glass cover must be made of hard material resistant to scratching and other damage. Referring to FIG. 3, the principle of movement detection in one direction is illustrated in some detail.

It consists of a linear light source 11 with a lens 12 focussing the sheet-like light field 13 at a position where it intersects the focus points 36 and 37 of the light receivers 21 and 23.

All the mentioned devices are mounted at the bottom of the recess 7 of FIG. 2. The movement is detected in the plane crossing points 36 and 37. Receivers 21 and 23 serve transmitter 11 while, as shown in FIG. 4, receivers 25 and 27 serve transmitter 14.

The light generating source 11 can be any homogeneous light generator (e.g. incandescent, gas discharge or semiconductor LEDs). The essentially cylindrical lens 12 concentrates the light into a sheet like beam, i.e. basically an illumination plane 13, tilted at an angle to the device bottom 6. The device contains two light receivers 21 and 23 with focusing lenses 22 and 24 which generate narrow directivity characteristics with axes 31 and 32, respectively crossing (piercing) the illumination plane 13 as the same height at crossing points 36 and 37, respectively and along a line parallel to the linear light source 11. This arrangement essentially detects only the light reflecting objects travelling at the height of points 36 and 37. If the reflective object travels in direction along the line connecting points 36 and 37, the light changing patterns in each of the receivers 21 and 23 will be equal, but delayed in time. The time delay depends on the distance between points 36 and 37 and the velocity of the movement. It can be shown (see, for example in: A. Papoulis: Probability, Random Variables and Stochastic Processes; McGraw Hill Inc., 1965.) that the cross correlation and cross covariance functions taken between the two detected light variation functions exhibit an extreme (maximum or minimum) at the delay equal to the delay needed for the same feature to reach from one to the other-light detector. The light sensitive devices 21 and 23 can be phototransistors or other devices known to detect light and generate proportional electrical signals. The lenses 22 and 23 may be of a simple focusing shape, e.g. plano convex glass lenses.

Figure 4:
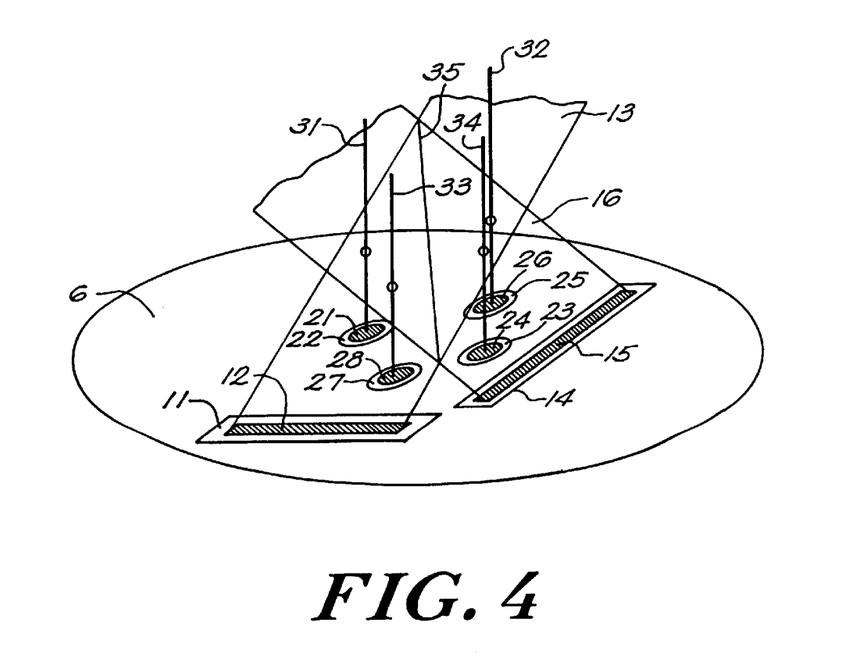
FIG. 4 is a schematic perspective drawing of the two optical setups as per FIG. 3, each of them used for detection of movement in its own plane.

Since we wish to detect and measure the velocity of the palm movement in all directions of a plane, the device outlined in FIG. 4 shows an arrangement of two devices as per FIG. 3 arranged at an angle between their light generators. The optimum angle is 90°, but other angles, except for angle 0° are essentially feasible as well. In this case, the two light generators 11 and 14 with lenses 12 and 15, respectively yield two light planes 13 and 16, respectively which cross along a line 35. The two sets of light receivers 21,23 and 25,27 which have directivity characteristics with axes 31,34 and 32,33, respectively cross the light planes at essentially the same height from the bottom 6. Movement of an object parallel to the light source 11 yields one component of the velocity of the light reflecting object, while the movement parallel to the light source 14 yields the orthogonal velocity. If the points where the light receiver axes and the light planes cross are near enough, there is an increased probability that at oblique movements, the system can recognize the same features of the operators palm since they cannot change abruptly. On the other hand, if the same feature appears on both of the paired receivers, the characteristic delay equals zero and thus can automatically be excluded, since the only other solution is trivial and impossible, i.e. infinite velocity of the hand movement.

Figure 5:
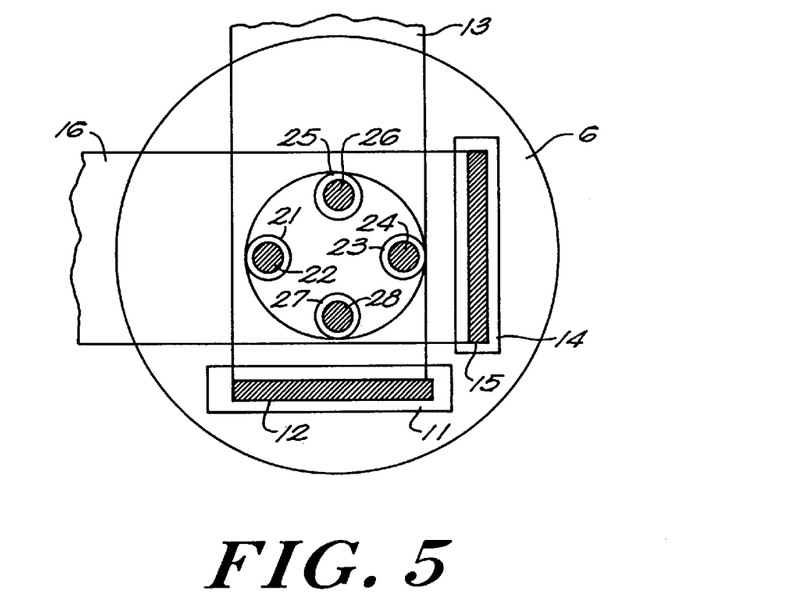
FIG. 5 is a top projection drawing of the optical movement detector of FIG. 4, outlining the actual arrangement of the light transmitters and receivers.

Referring to FIG. 5, we see a projection of the light emitting-receiving arrangement at the bottom 6 of the device, which further clarifies the explanation of FIG. 4. The method for calculation of the velocity along one pair of the light receivers can be realized by using electronic circuits as in the block diagram of FIG. 6. The received light variations from the two receivers are fed to a cross correlation circuit. The output of the cross correlation circuit is taken to the maximum (or extreme) detection circuit (for example by detection of an abrupt change of the first derivative), which detects the maximum of the thus calculated cross correlation function and the delay time at which this occurs. Division of the light axes distance by the delay yields the movement velocity in the specified direction.

Figure 6:
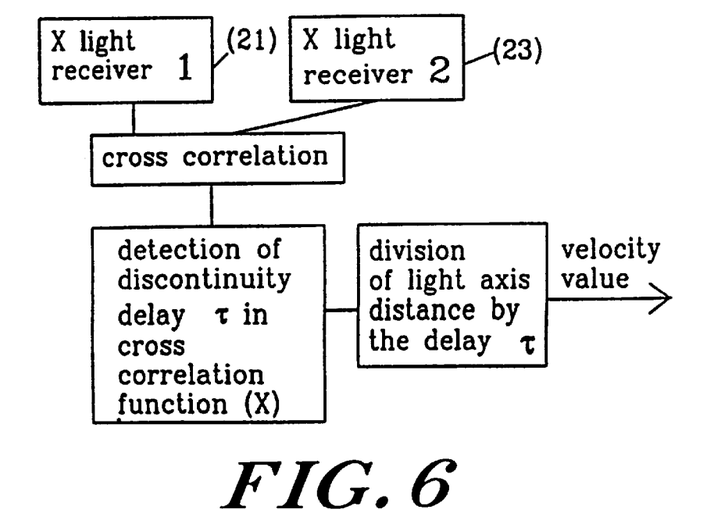
FIG. 6 is a block diagram of the circuitry used to calculate the actual velocity components.

FIG. 6 is a block diagram of the circuitry used to calculate the actual velocity components by cross correlating the received light from the two receivers along one axis (in this example, the X axis), detecting the characteristic delay by locating the characteristic discontinuity on the cross correlation curve, and dividing the distance between the two receivers by the characteristic delay value.

Figure 7:
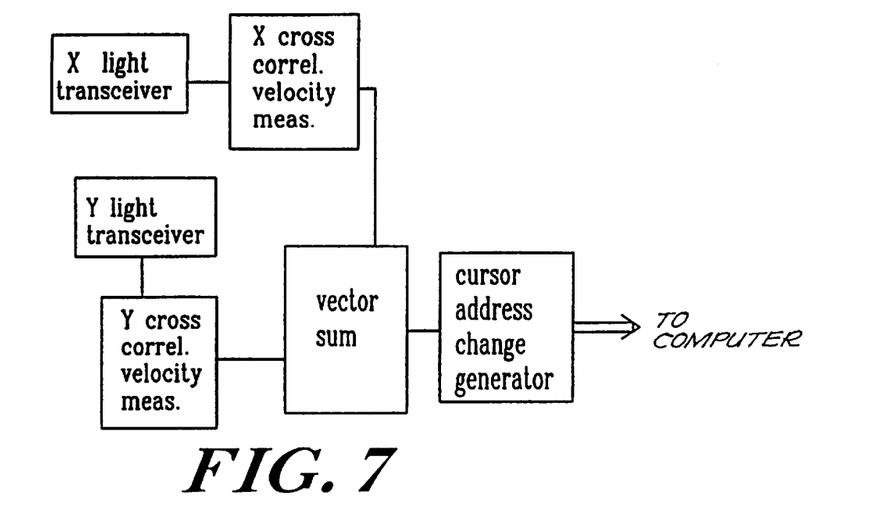
FIG. 7 is a block diagram of the electronic circuitry which can use data from two circuits per FIG. 6.

Referring to FIG. 7, each of the results of one dimensional measurements as per FIG. 6 and 3 for the X- and the Y-direction are fed to a vector summing circuit which trigonometrically takes into account the angle between the single dimension devices. Where the angle is 90° the Pythagorean theorem suffices. The resulting signal is used to steer the cursor on the computer screen.

Figure 8:
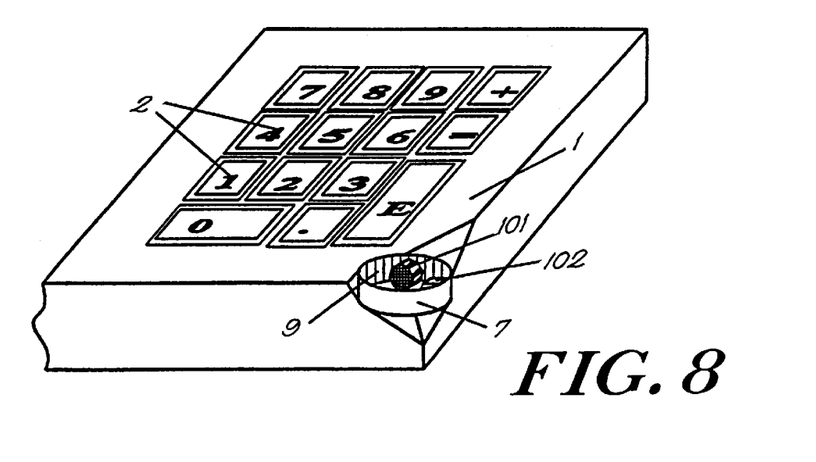
FIG. 8 is a perspective illustration of a part of the keyboard with the right, bottom end keys and the ultrasound pointing device built into the right corner of the housing.

Referring to FIG. 8, a further embodiment having no moving parts at all is shown. An ultrasonic pointing device is positioned at the right side of the computer keyboard for right handed operators and it can be mounted at the left side for the left handed operators. The position of the pointing device is such that it can be accessed without obstructing the view of or access to the keyboard. The ultrasonic pointing device is arranged in a recess 7 of the housing 1, in this case shown as round, although it may have any suitable form (e.g. triangular, square, etc.). At the bottom of the recess, two ultrasonic transmitter-receivers 101 and 102 are mounted.

The pointing device has a depth 9 defined such as to fix the distance between the transmitting-receiving transducers when the operator actuates the device by moving the palm in front of it. Two ultrasound transmitting-receiving devices (transceivers) 101 and 102 are mounted within the pointing device housing.

The transceivers 101, 102 can either operate as pulse systems or as continuous wave systems. A pulse system operates by transmitting short pulses of ultrasound and receiving them, when reflected, with the same transducer. The continuous wave transducer is, in fact, a split transducer in which one part (the form can vary, but simple geometrical divisions are preferred) continuously transmits ultrasound and the other part continuously receives the reflected ultrasound. In both cases, the difference between the transmitted and received ultrasound frequency provides a measure of the velocity of the reflector (hand) which can be evaluated using the Doppler formulae. The depth 9 of the case 7 is chosen such as to enable the operator to lean the palm against the top of the case 7 and thus maintain the palm at the appropriate distance from the transducers as shall be explained when discussing FIGS. 8,9 and 10. The mode of actuating the Doppler measuring devices by movement of the hand 5 in front of the ultrasonic devices without touching them is illustrated in FIG. 1. The hand can, however, be leaned against the computer housing 1 since the depth of the device described in connection with FIG. 8 keeps the palm surface at the appropriate distance from the ultrasonic transducers.

Figure 9:
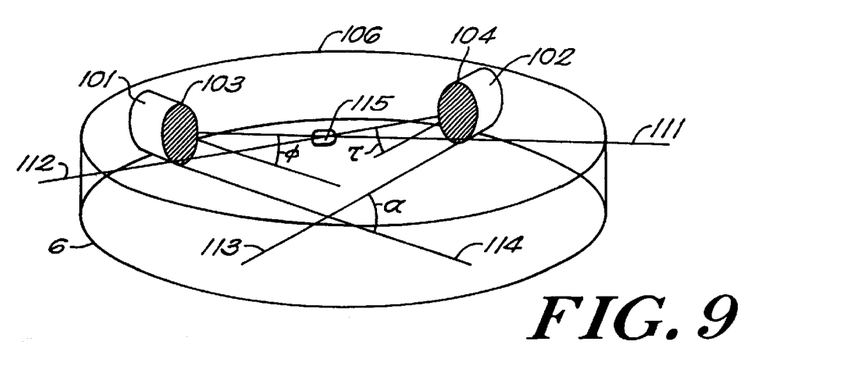
FIG. 9 illustrates in more detail the setup of the positioning and aiming of the ultrasound transmitter-receivers within the pointing device.

Referring to FIG. 9 we can explain the geometrical relations and the method of operation in more detail.

Ultrasonic transceivers 101 and 102 are mounted at the bottom 6 of the pointing device (illustrated here as a shallow round cup with the upper rim 106, although any other suitable form (elliptic, triangular, square, etc.) may be used) as well. The two ultrasonic transceivers can operate as pulse wave transducers, in which case they are essentially single, normally piezoelectric, transducers, or as continuous wave transducers, in which case they are composed of a continually transmitting part and a continually receiving part. In both cases the transceivers have beam tilting devices 103 and 104 mounted at their front surfaces in order to tilt their respective beams 111 and 112 at appropriate elevation angles $\phi$ and $\tau$. The projections of the beam axes at the bottom 6 are under an angle $\alpha$ which shall preferably be nearly a right angle. The beams cross within a well defined area 115 in space at a position so chosen that the palm of the operator's hand moves in this particular area while activating the system. Thus, the components of the movements of the palm can be detected by Doppler methods using the transceivers 101 and 102 and associated electronic circuits. In order to achieve a practically applicable directivity and narrowness of the main beam lobe, the dominant surface dimension of the transceiver face must be much larger than the wavelength at the frequency used, e.g. ten times larger than the wavelength.

Figure 10A:
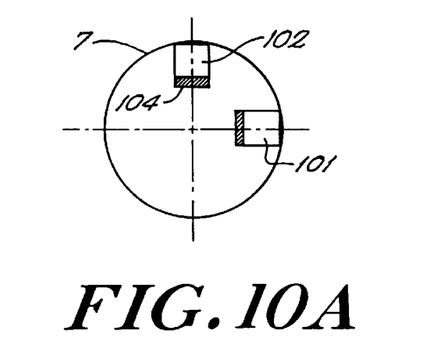
FIG. 10 illustrates the device of FIG. 9 in three projections in order to clarify the preferred geometrical arrangement.
Figure 10B:
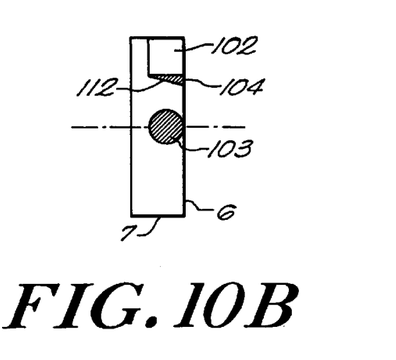
Figure 10C:
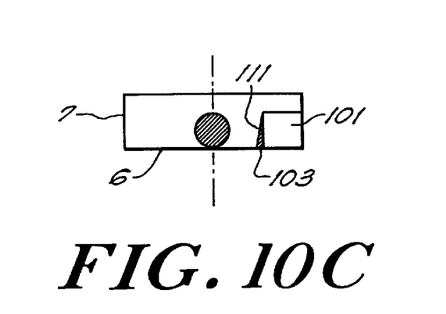

FIG. 10 shows the device from FIGS. 8 and 9 in three projections, illustrating the preferred geometrical relations of the different components of the system. The elevation tilting of the beams is, in this illustration, secured with beam tilting devices, lenses 103 and 104, but it is understood that the beam can be tilted by mounting the transceiver transducers themselves at some desired elevation and azimuthal angle.

Figure 11:
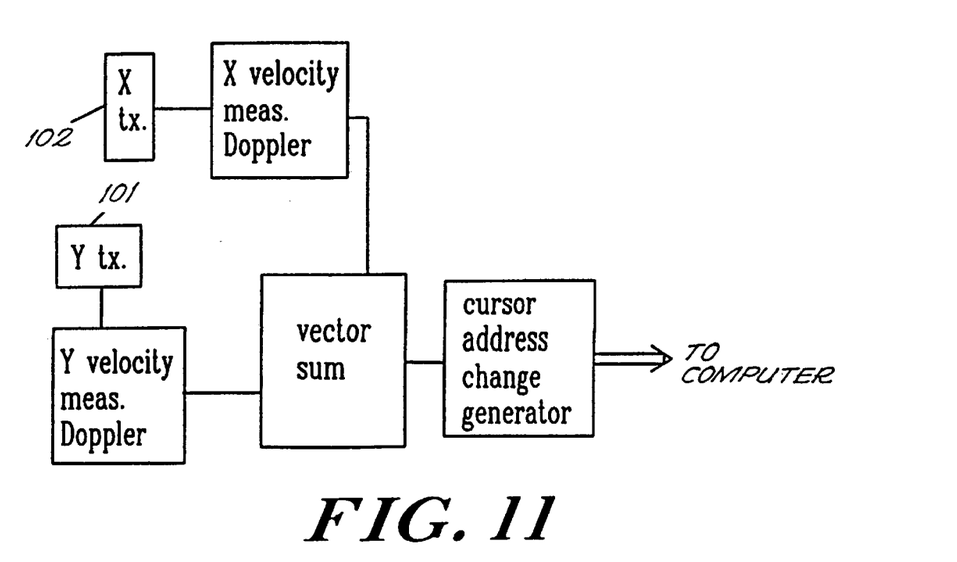
FIG. 11 is a block diagram of electronic circuits which can utilize the data obtained from devices described in FIGS. 8 to 10 in such a way as to vector sum the hand (palm) movement velocity data and form a composite velocity data which is used for cursor movement on the computer screen (GUI).

The block diagram of electronic circuits which can use the data obtained by reflection of ultrasonic waves from the palm of the operator is illustrated in FIG. 11. The transceivers are connected to Doppler shift measurement devices known in the art of electronic. Alternatively, one can use time domain calculations, e.g. autocorrelation calculations, to assess the velocity. These Doppler shift measurement devices yield components of the movements of the operator's palm and are vector summed, subtracting elevational movements which appear simultaneously on both 101 and 102 transducers. This vector sum of the palm movement velocities parallel to the bottom (6 in FIGS. 9 and 10) are then used to generate the cursor address change in the computer memory. The frequencies used must be of the order of magnitude of a few hundred kHz, so that the wavelength is of the order of magnitude of about a millimeter. The advantage of using the pulse mode Doppler device is that the distance between the transducer surface and the sensing volume 115 can be additionally secured by pulse-time-gating. The disadvantage of the pulse Doppler is that it requires device a more complicated electronic system compared to the continuous wave mode, which, however has a less well defined sensitivity area 115.

The overall result is the movement of the cursor on the screen without the use of moving parts.

A compact computer pointing device has been described without moving parts which detects the movement of objects, including an operator's hand, by means of various waves. In an ultrasound embodiment it consists of two ultrasound transmitter-receivers mounted at an appropriate position on the computer housing or keyboard which can sense the direction and velocity of moving objects in front of them using the Doppler effect. In an optical embodiment, it consists of two optical transmitter-receivers 11/21; 14/27 mounted at an appropriate position on the computer housing or keyboard which can sense the direction and velocity of moving objects in front of them using light waves and the cross correlation calculations. The movement can be exerted by the operator moving the palm of his hand in front of these transceivers in the desired direction and at the desired speed. The, thus detected, movement is measured and utilized as velocity vectors for generation of the signals for screen cursor movement. The system is particularly suited for compact computers where efficient use of space is important.

We claim:

1. A computer pointing device for a computer having a graphic screen, said pointing device comprising
   a computer housing,
   sensor means arranged within said housing and including
      at least a pair of transmitters for transmitting waves to a detection area located outside of said housing, and
      at least a pair of receivers for receiving waves reflected by an object disposed in said detection area,
   said detection area being disposed a pre-selected height above said housing, said at least a pair of receivers configured to reject waves originating from outside said detection area,
   vector velocity measuring means for measurement of components of velocity of said object within said detection area, and for providing vector velocity signals representing the velocity of said object, and
   control means responsive to said vector velocity signals for varying the position of a graphic pointing means within the graphic screen of said computer.

2. A computer pointing device according to claim 1, wherein said sensor means has at least two ultrasonic transducer means, each of said transducer means being characterized by a directivity function having an axis and being mounted below a portion of a wall of said housing at a depth such that a movement of an essentially planar wave reflecting object, which is leaned against the portion of the wall and which is translated at an essentially constant distance from said transducer means, is measured along the axes of the directivity functions of said transducer means.

3. A computer pointing device according to claim 2, wherein said two ultrasonic transducer means are mounted on said computer housing at an azimuthal beam axis intersection angle ($\alpha$) other than 0 degrees, said transducer means being capable of transmitting and of receiving directive ultrasonic signals into the space in front of them and from that space respectively.

4. A computer pointing device according to claim 3, wherein said directivity functions of said ultrasonic transducer means intersect in a well defined detection area in space.

5. A computer pointing device according to claim 1, wherein
said sensor means has at least two ultrasound transducer means, and
said vector velocity measurement means comprises electronic circuits capable of generating at least two vector velocity components representative of the velocity of a reflecting targets in front of said transducers means by using the Doppler effect and vector summing said at least two vector velocity components and of submitting them to said control means.

6. A computer pointing device according to claim 1, wherein said control means generates a vector sum of the velocity components obtained by said vector velocity measurement means, and uses the vector sum to generate a signal for generating a change of the position of said graphic pointing means.

7. A computer pointing device according to claim 1 wherein said sensor means comprises
   at least two linear light emitting means, each characterized by a transmission directivity function having an axis, and
   at least two pairs of focused light receiving means each characterized by a reception directivity function having an axis.

8. A computer pointing device according to claim 7 wherein said light emitting means are mounted at a non-zero azimuthal angle, and said axes of said transmission directivity functions and said axes of said reception directivity functions intersect.

9. A computer pointing device according to claim 1, wherein said sensor means are disposed in a recess of said housing said recess having a recess bottom.

10. A computer pointing device according to claim 9, wherein said sensor means comprises
    at least two linear light emitting means, and
    at least two pairs of focused light receiving means, and
    said light emitting means and said light receiving means are mounted at a bottom of said recess which is deep enough as not to protrude from said recess.

11. A computer pointing device according to claim 2, wherein said portion of the wall below said detection area has a cover transparent for light waves.

12. A computer pointing device according to claim 9, having at said recess bottom an optical device which includes
    a linear light emitter defining a light emitter axis, said linear light emitter having a transmitting face with a cylindrical lens mounted thereon,
    first and second light receivers, each having a receiving face with a focusing lens mounted thereon and a directivity function having an axis, said first and second light receivers defining a line parallel to said light emitter axis.

13. A computer pointing device according to claim 12, wherein said cylindrical lens is shaped and tilted to generate a light plane in front of said optical device, said light plane being non-orthogonal relative to said recess bottom.

14. A computer pointing device according to claim 13, wherein the directivity function axis of said first light receiver intersects said light plane at a first intersection point, the directivity axis of said second light receiver intersects said light plane at a second intersection point, and a line connecting said first and second intersection points is parallel to said linear light emitter axis and is positioned at a distance above said recess bottom, said distance being essentially the depth of said recess.

15. A computer pointing device for a computer having a graphic screen, said pointing device comprising a computer housing, sensor means arranged within said housing and including
at least two ultrasonic transducer means for transmitting waves to a detection area located outside of said housing and for receiving waves reflected by an object disposed in said detection area, said at least two ultrasonic transducer means being mounted on said computer housing at an azimuthal beam axis intersection angle ($\alpha$) other than 0 degrees and being capable of transmitting and of receiving directive ultrasonic signals into the space in front of them and from that space respectively, each of said ultrasonic transducer means being characterized by a directivity function having an axis and being mounted below a portion of a wall of said housing at a depth such that a movement of an essentially planar wave reflecting object, which is leaned against the portion of the wall and which is translated at an essentially constant distance from said transducer means, is measured along the axes of the directivity functions of said transducer means vector velocity measuring means for measurement of components of velocity of said object within said detection area, and for providing vector velocity signals representing the velocity of said object, and control means responsive to said vector velocity signals for varying the position of a graphic pointing means within the graphic screen of said computer, wherein lines formed by projections of the axes of the two ultrasonic transducer means on a plane parallel to and spaced apart from said detection area intersect at a non-zero angle ($\alpha$).

16. A computer pointing device for a computer having a graphic screen, said pointing device comprising a computer housing, sensor means arranged within said housing and including
at least two ultrasonic transducer means for transmitting waves to a detection area being disposed at a pre-selected height above said housing and for receiving waves reflected by an object disposed in said detection area, each of said ultrasonic transducer means being characterized by a directivity function having an axis and being mounted below a portion of a wall of said housing at a depth such that a movement of an essentially planar wave reflecting object, which is leaned against the portion of the wall and which is translated at an essentially constant distance from said transducer means, is measured along the axes of the directivity functions of said transducer means vector velocity measuring means for measurement of components of velocity of said object within said detection area, and for providing vector velocity signals representing the velocity of said object, and control means responsive to said vector velocity signals for varying the position of a graphic pointing means within the graphic screen of said computer, wherein each of said directivity function axes are tilted at an elevation angle ($\phi$ and $\tau$) at a point in said detection area.

17. A computer pointing device for a computer having a graphic screen, said pointing device comprising a computer housing, sensor means arranged within said housing and including
at least two ultrasonic transducer means for transmitting waves to a detection area located outside of said housing and for receiving waves reflected by an object disposed in said detection area, each of said transducer means being characterized by a directivity function having an axis and being mounted below a portion of a wall of said housing at a depth such that a movement of an essentially planar wave reflecting object, which is leaned against the portion of the wall and which is translated at an essentially constant distance from said transducer means, is measured along the axes of the directivity functions of said transducer means vector velocity measuring means for measurement of components of velocity of said object within said detection area, and for providing vector velocity signals representing the velocity of said object, and control means responsive to said vector velocity signals for varying the position of a graphic pointing means within the graphic screen of said computer, wherein said directivity functions of said two transducer means are achieved by making their dominant surface dimensions larger than the wavelength of the generated ultrasound.

18. A computer pointing device for a computer having a graphic screen, said pointing device comprising a computer housing, sensor means arranged within said housing and including
at least two linear light emitting means, each characterized by a transmission directivity function having an axis for transmitting waves to a detection area located outside of said housing, and at least two pairs of focused light receiving means each characterized by a reception directivity function having an axis for receiving waves reflected by an object disposed in said detection area, vector velocity measuring means for measurement of components of velocity of said object within said detection area, and for providing vector velocity signals representing the velocity of said object, and control means responsive to said vector velocity signals for varying the position of a graphic pointing means within the graphic screen of said computer, wherein said graphic pointer means within the graphic screen of said computer has an address generator, and said vector velocity measurement means comprises electronic circuits for calculating the cross correlation of the signals obtained by said at least two pairs of focused light receiving means, for calculating the quotient of the distance between the at least two pairs of focused light receiving means and the characteristic delay at which an extreme occurs in said cross correlation function, and for vector sum data from at least two of said quotients and submitting them to the address generator.

19. A computer pointing device for a computer having a graphic screen, said pointing device comprising a computer housing, sensor means disposed in a recess of said housing, said recess having a recess bottom on which is mounted an optical device having two essentially linear light emitters with essentially cylindrical lenses at their transmitting faces for transmitting waves to a detection area located outside of said housing, each light emitter being characterized by a directivity function having an axis, and at least two pairs of light receivers for receiving waves reflected by an object disposed in said detection area, said light receivers each having a directivity function having an axis and each having receiving faces with focusing lenses mounted thereon, said receiving faces arranged such that lines connecting said receivers forming a receiver pair are essentially parallel to said corresponding linear light emitters, vector velocity measuring means for measurement of components of velocity of said object within said detection area, and for providing vector velocity signals representing the velocity of said object, and control means responsive to said vector velocity signals for varying the position of a graphic pointing means within the graphic screen of said computer.

20. A computer pointing device according to claim 19, having an essentially cylindrical light emitter lens of a shape and tilt to generate an elevationally oblique light plane in front of said optical device.

21. A computer pointing device according to claim 17, wherein said light receivers are arranged pointing in such a direction that the connection lines between the points, where their directivity axes penetrate said light planes, are essentially parallel to said light emitters, and are positioned at a distance above said bottom of the recess, said distance being essentially the depth of said recess.

22. A computer pointing device according to claim 19, wherein said light emitters and said light receivers are mounted such that their directivity functions include an azimuthal angle different from 0°.

23. A computer pointing device according to claim 19, wherein said vector velocity measurement means contains an electronic circuit which calculates the cross correlation function between the light intensity received by said light receivers.

24. A computer pointing device according to claim 23, wherein said electronic circuit detects a characteristic delay value at which an extremum occurs in said cross correlation function and divides the distance between said light receivers by said characteristic delay value.

25. A computer pointing device for a computer having a graphic screen said pointing device comprising a computer housing, sensor means arranged within said housing and including
at least a pair of transmitters for transmitting waves to a detection area located outside of said housing, and
at least a pair of receivers for receiving waves reflected by an object disposed in said detection area, vector velocity measuring means for measurement of components of velocity of said object within said detection area, and for providing vector velocity signals representing the velocity of said object, and control means responsive to said vector velocity signals for varying a memory address corresponding to the position of a graphic pointing means within the graphic screen of said computer, and including electronic circuitry which generates a vector sum of the velocity components obtained by said vector velocity measurement means and uses the vector sum to generate a signal for generating a change of the position of said graphic pointing means by changing its memory address.

* * * * *